United States Patent [19]

Potter

[11] Patent Number: 5,352,855
[45] Date of Patent: Oct. 4, 1994

[54] JUNCTION CLAMP FOR WIRING HARNESS

[75] Inventor: Lex B. Potter, Columbus, Ind.

[73] Assignee: Cumming Electronics Company, Inc., Columbus, Ind.

[21] Appl. No.: 35,944

[22] Filed: Mar. 23, 1993

[51] Int. Cl.⁵ .............................................. H02G 3/02
[52] U.S. Cl. ........................... 174/135; 174/71 R; 174/72 A; 285/156; 285/420; 285/424; 248/74.3
[58] Field of Search .............. 248/74.3, 68.1; 24/16 PB, 17 AP, 17 B, 339, 336; 174/72 R, 72 A, 71 R, 135, 91; 285/156, 420, 47, 424

[56] References Cited

U.S. PATENT DOCUMENTS

| | | | |
|---|---|---|---|
| 3,145,260 | 8/1964 | Reid et al. | 174/72 R |
| 3,177,528 | 4/1965 | Flower et al. | 285/156 X |
| 3,711,633 | 1/1973 | Ghirardi et al. | 174/72 A |
| 3,944,260 | 3/1976 | Petroczky . | |
| 4,112,967 | 9/1978 | Withem | 285/47 X |
| 4,168,091 | 9/1979 | Boomgarden et al. . | |
| 4,227,667 | 10/1980 | Dickerson . | |
| 4,691,945 | 9/1987 | Cottrell et al. . | |
| 4,696,324 | 9/1987 | Petronko | 285/47 X |
| 4,797,512 | 1/1989 | Kumagai et al. | 285/156 X |
| 5,020,832 | 6/1991 | Coblentz . | |
| 5,266,740 | 11/1993 | Hsu | 174/71 R |

FOREIGN PATENT DOCUMENTS 1423036  11/1965  France .............................. 174/72

Primary Examiner—Dave W. Arola
Attorney, Agent, or Firm—Woodard, Emhardt, Naughton Moriarty & McNett

[57] ABSTRACT

A unitary, molded plastic junction clamp having a generally T-shaped final configuration for securing the wiring junction between a trunk portion and a split out branch portion of a wiring harness includes a flexible plastic main panel having a generally rectangular trunk section and a crossing generally rectangular branch section, a pair of flexible cable ties disposed on opposite sides of the trunk section and being integrally molded therewith and a pair of flexible cable ties associated with the branch portion. As a one piece molded unit the junction clamp begins as a substantially planar member and is able to be readily formed around the trunk portion of the wiring harness. The opposite pair of cable ties encircle the trunk portion at which point they are secured and tightened. The forming of the trunk section of the main panel so as encircle the trunk portion of the wiring harness disposes the branch section of the main panel in position upwardly and around the split out branch portion of the wiring harness. The cable ties associated with the branch section are then drawn around the branch portion and secured so as to tighten the branch section around the branch portion and create the generally T-shaped junction securing the trunk portion and split out branch portion of the wiring harness together.

6 Claims, 3 Drawing Sheets

JUNCTION CLAMP FOR WIRING HARNESS

BACKGROUND OF THE INVENTION

The present invention relates in general to wiring, cabling, wiring harnesses and cable ties. More particularly the present invention pertains to the assembly and routing of wires in a cable or wiring harness when a generally right-angled junction or similar wiring breakout is required to be made from the trunk in order to form a branch line.

Wiring harnesses are typically used for situations where the number of wires to be routed through a unit is significant and whereas a result of the number of wires, space considerations must be specifically addressed. In stationary units such as electrical equipment cabinets and consoles the multiple strands of insulated wire can usually be left uncovered and secured together by nylon wire ties. The conventional wire ties typically include a saw-tooth band and a receiving and interlocking head. These two components are typically molded as a one-piece unitary member. When the proper orientation is established and the band correctly inserted into the head, the saw-teeth of the band become interlocked with the locking tab on the interior of the head, thereby preventing the band from being loosened. The saw-tooth configuration allows the band to be tightened into a smaller encircling loop thus allowing the tie to be extended around a bundle of wires and tightened so as to hold that bundle of wires together. When the secured wiring harness is routed through the unit these wiring ties may be used with mounting blocks or anchor blocks which may either be fastened to the walls or floor of the console by threaded fasteners or adhesively attached so as to fix the wire tie to a specific location on the surface or side wall of the cabinet or console. By the use of such anchor blocks the wiring harness is fixed in position including the main trunk and all branch lines which are split out from the trunk.

With stationary cabinetry and units of the type described there is typically very little movement, virtually no vibration and no exposure to contaminant fluids or chemicals. In these situations there is little if any concern that the insulation on the individual wires will become abraided or cut. Even if a small break or cut occurs, without the presence of fluids or chemicals, electrical shorts to the chassis are unlikely.

When a wiring harness is created for a motor vehicle there are concerns that the movement of the vehicle, shock impacts and vibrations could lead to cuts and abrasions to the insulation of the wires, especially in those areas where the wiring harness must be routed up and over or around an edge or sharp corner. There is also a concern that various liquids and chemicals may splash up or leak onto the wiring harness and thus any breaks in the insulation of the individual wires could result in electrical shorts. While some electrical shorts may not be significant, others could be significant, resulting in motor vehicle failure or an inoperative condition to some critical portion of the vehicle.

In order to minimize these concerns a conduit or sheath is typically used in motor vehicle wiring as an enclosing sleeve over the trunk and branches of the wiring harness. Although this enclosing sleeve is frequently slit lengthwise in order to allow breakout exiting of some of the wires from the main trunk in order to create a branch line, this enclosing sleeve does protect the harness wires from cuts or abrasions to the wire insulation.

When wires are pulled from the trunk for a breakout branch, there is still a desire to run these branch wires through a protective enclosing sleeve. It is also important for the branch sleeve to be secured in position up against the trunk sleeve. There are presently three basic ways to address these needs. One way is to securely tape the branch sleeve directly to the trunk sleeve. Another way is to use a rigid, clam-shell, T-junction clamp. A third way, but one which is really not suitable due to the possible damage to the wires, is to use several wire ties for the trunk sleeve on either side of the breakout branch as well as for the branch sleeve.

The drawbacks with the taping method include the time which it takes and the non-uniformity of the junction. Since taping techniques vary widely with different assembly workers the wiring harness junction will vary from harness to harness, even with the same worker. There simply is no standard as to the taping practice nor any established or predictable quality level. The drawbacks with the snap-fit, clam-shell structure include its size and rigidity and its fixed design. The rigidity of the structure forces either an oversizing so that one size will fit a majority of the trunk-branch junctions or alternatively a large number of different units must be manufactured so that they can be more closely sized and tailored to the specific junction. The greater the number of different sizes, the greater the molding costs and the greater the inventory inefficiencies. If there would be ten or twelve standard sizes for this clam-shell junction clamp, then these would have to be inventoried and provided with a wiring harness size range so that the assembly worker would know specifically which style to use at which point in the wiring harness.

With the wiring harness junction clamps there is a desire for some flexibility as it may be, if not necessary at least preferred, to move or flex the branch line slightly relative to the trunk so as to establish a preferred fit or routing through certain clearance areas and around specific components. The rigid clam-shell design does not permit such flexibility and movement in the orientation of the split-out branch.

In the art of T-junctions and connections for trunk lines and breakout branch lines there are several patent references. Many of these references pertain to pipe joints and a representative sampling of such patent references is listed below:

| Patent No. | Patentee | Issue Date |
| --- | --- | --- |
| 5,020,832 | Coblentz | June 4, 1991 |
| 4,168,091 | Boomgarden et al. | September 18, 1979 |
| 4,691,945 | Cottrell et al. | September 8, 1987 |
| 3,944,260 | Petroczky | March 16, 1976 |
| 4,227,667 | Dickerson | October 14, 1980 |

In order to address all of the concerns which have been mentioned, the present invention has been created. The present invention provides as a one-piece, unitary unit a flexible covering panel for the trunk and for the branch at their junction location. This flexible covering panel is molded in combination with wiring ties in order to secure one portion of the covering panel to the trunk and to secure another portion of the covering panel to the branch. Several variations are possible and contemplated within the scope and teachings of the present invention.

SUMMARY OF THE INVENTION

A junction clamp for securing the wiring junction between a trunk portion and a split-out branch portion of a wiring harness according to one embodiment of the present invention comprises a flexible main panel having a trunk section and an integral branch section, a first flexible securement tie joined to the trunk section, said first flexible securement tie in cooperation with the trunk section being designed and arranged to encircle the trunk portion of the wiring harness and a second flexible securement tie joined to the branch section, said second flexible securement tie in cooperation with said branch section being designed and arranged to encircle the branch portion of the wiring harness.

One object of the present invention is to provide an improved junction clamp for a wiring harness.

Related objects and advantages of the present invention will be apparent from the following description.

DESCRIPTION OF THE PREFERRED EMBODIMENT

Figure 1:
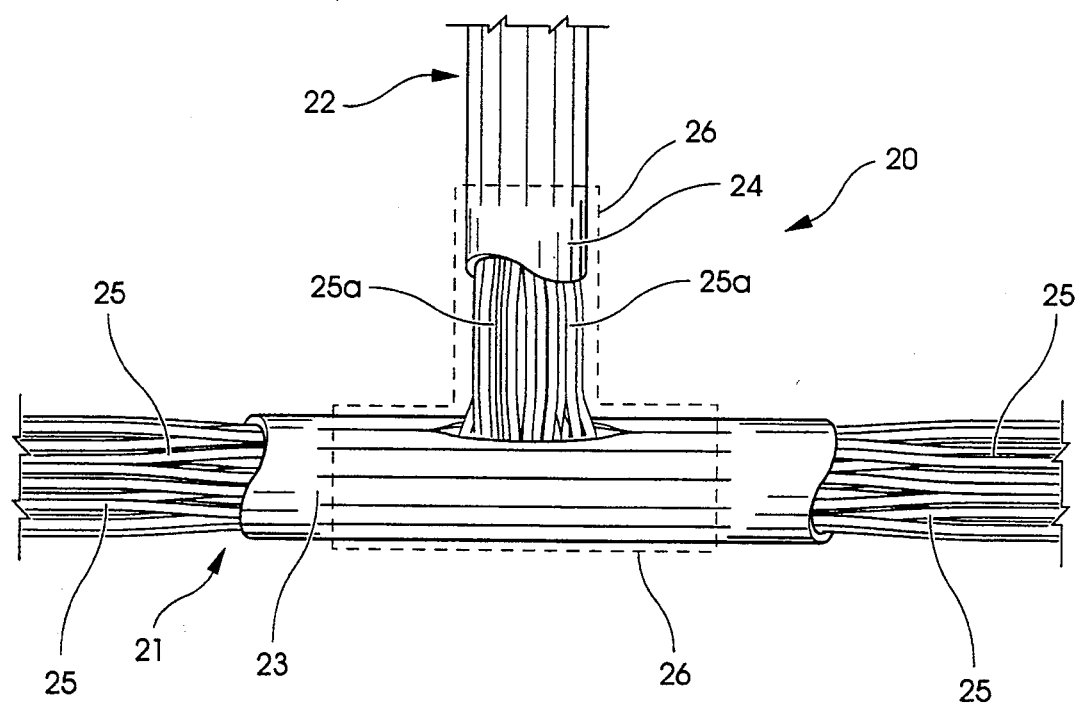
FIG. 1 is a front elevational view of a representative wiring harness trunk and a breakout branch to be secured by the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated part of a wiring harness 20 which includes the main trunk 21, breakout branch 22 and enclosing sleeves 23 and 24. As will be appreciated, each of the insulated wires 25 comprising trunk 21 are electrically connected between points within the corresponding device or equipment. The insulated wires 25a which are broken out in order to create branch 22 are being routed to an electrical source or component while the remaining wires in trunk 21 continue on to other points in the device or equipment. Sleeves 23 and 24 are illustrated in only partial form in order to show the insulated wires 25 and 25a. It should also be understood that the breakout branch 22 is but one of what could be several breakout branches as part of the entire wiring harness 20. It is also to be understood that branch 21 could be regarded as its own trunk with additional, smaller branches breaking out from this first branch. The T-junction illustrated by broken line 26 is intended to represent the location and general style of the junction clamp which is the focus of the present invention (See FIG. 2).

Figure 2:
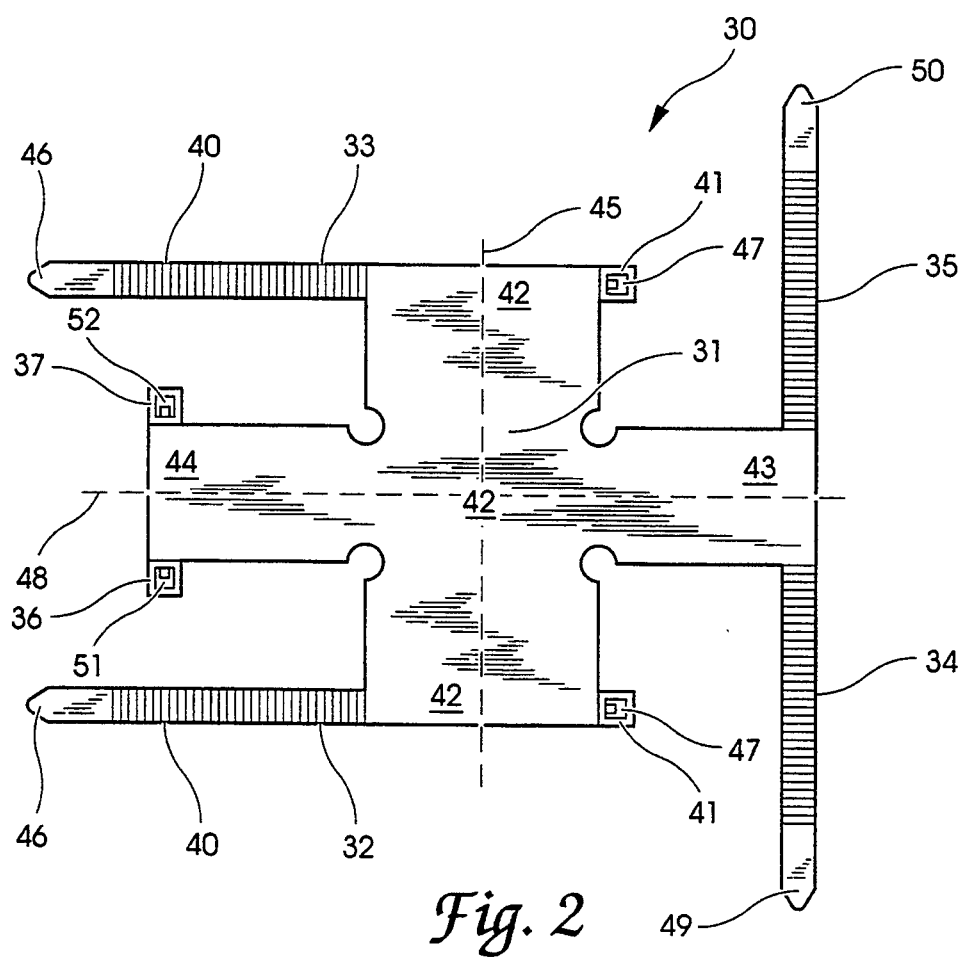
FIG. 2 is a top plan view of a wiring harness junction clamp according to one embodiment of the present invention.

Referring to FIG. 2 there is illustrated a junction clamp 30 which includes a substantially flat, relatively thin, flexible main panel 31, a first wire tie 32, a second, oppositely disposed wire tie 33, a pair of oppositely disposed tie bands 34 and 35 which are intended to engage and interlock with tie heads 36 and 37, respectively. The wire ties which are illustrated as well as the separate tie bands and tie heads are all designed with a saw-tooth ratchet method of engagement and interlock. Once a band is inserted and properly started into its corresponding head, it can only be advanced (tightening) and cannot be reversed (loosened). The enclosing loop which is formed by inserting the tie band into its tie head gets smaller as the band is advanced or pulled through. If this loop is placed around an object there is a crimping or tightening of the band around that object. Hand tools exist which do the tightening to a desired level and then cut off that portion of the tie band which extends through the far side of the corresponding tie head. All of the ratchet-tooth interlocking takes place inside the tie head where a small tab interlockingly engages the saw-teeth of the tie band.

In the embodiment of FIG. 2, wire ties 32 and 33 are each intregally molded as part of panel 31 and each tie includes a corresponding and cooperating tie band 40 and tie head 41. Likewise tie bands 34 and 35 are each integrally molded as part of main panel 31 as are tie heads 36 and 37. Main panel 31 has a cross-type shape with a wider central section 42 and crossing or outwardly extending side sections 43 and 44 which are arranged so as to be generally perpendicular with central section 42. As is also illustrated in this particular embodiment side sections 43 and 44 separate tie bands 34 and 35 as well as tie heads 36 and 37. Similarly, central section 42 separates each tie band 40 from its corresponding tie head 41. The main panel 31 can also be thought of in the reverse sense where side sections 43 and 44 are connected to create a central section and the outer portions of section 42 become the crossing sections which are arranged perpendicular to the side sections.

Figure 4:
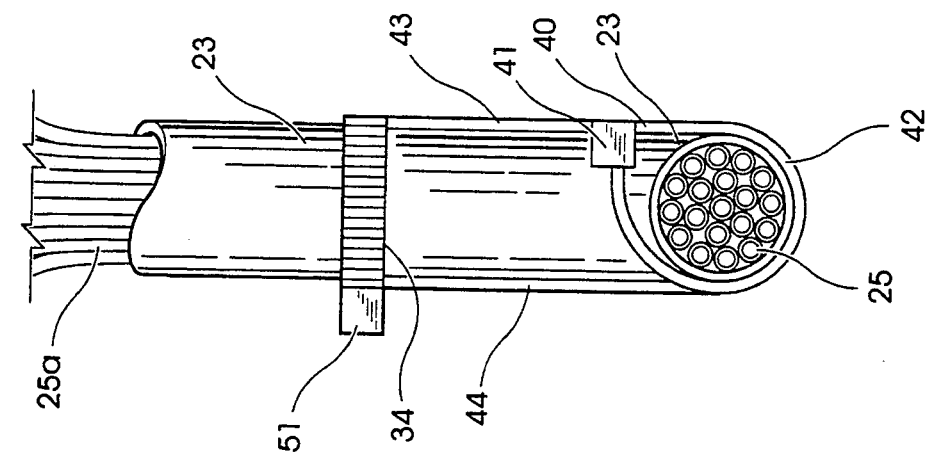
FIG. 4 is a side elevational view in full section of the FIG. 3 assembly.
Figure 3:
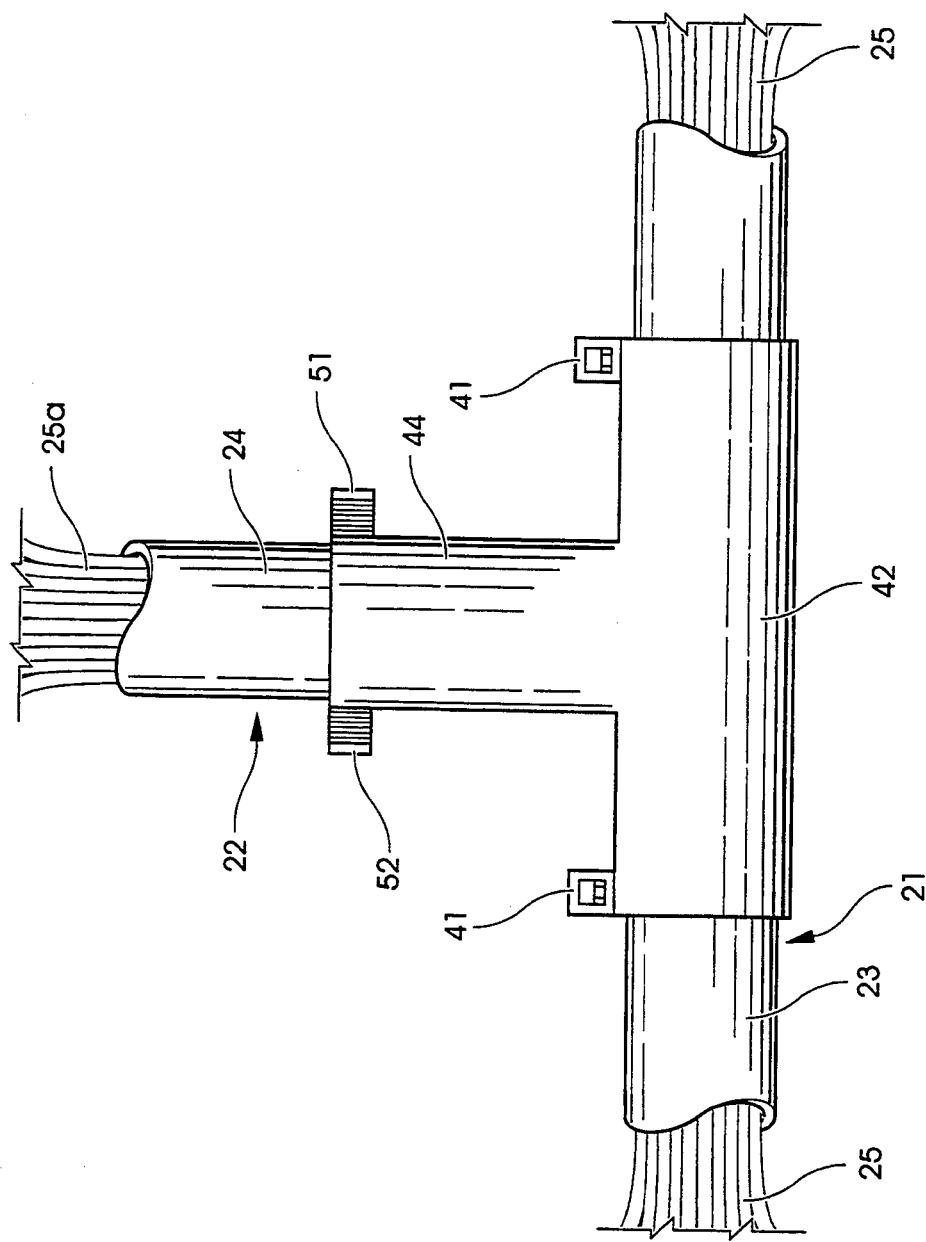
FIG. 3 is a front elevational view of a wiring harness junction as secured by the FIG. 2 wiring harness junction clamp.

The junction clamp 30 of FIG. 2 is designed such that central section 42 can be coiled about its longitudinal axis (line 45) so as to align the tips 46 of each tie band 40 with the central opening 47 of its corresponding tie head 41. As shown in FIGS. 3 and 4, the central section 42 fits around the trunk 21. However, the central section does not completely encircle the trunk and tie head 41 is positioned so as to receive the tie band 40 which extends along a tangent line of the trunk. In this manner central section 42, generally in the shape of a cylindrical sleeve is securely tightened around the trunk from one side of breakout branch 22 to the opposite side. It is the cooperating combination of central section 42, tie bands 40 and tie heads 41 which completely encircle the trunk 21. Similarly, it is the cooperating combination of side sections 43 and 44, tie bands 34 and 35 and tie heads 36 and 37 which completely encircle branch 22.

When the central section is coiled in the manner described, it draws side sections 43 and 44 upwardly towards each other in a somewhat parallel manner and in a fashion which is generally perpendicular to axis line 45. These two side sections 43 and 44 then curved along their common (when flat) longitudinal axis line 48. This curving of the side sections combined with some bending or flexing of the tie bands 34 and 35 brings the tips 49 and 50 of tie bands 34 and 35, respectively, into alignment with the center openings 51 and 52 of tie heads 36 and 37, respectively. This allows the side sections to create a generally cylindrical sleeve which is tightened around branch 22.

In the FIG. 3 and FIG. 4 illustrations it can be seen that the junction clamp 30 once secured in position on the wiring harness has a generally T-shape similar to the broken line outline in FIG. 1. The wiring breakout from trunk 21 which creates branch 22 is enclosed and there is no risk that sleeve 24 will slip or pull away from sleeve 23 and thereby expose any of the insulated wires 25a (or 25). The outer enclosing sleeves created by main panel 31 are able to be tightly secured with the wiring ties around the trunk and branch without having to crimp the bands so tightly so as to possibly damage the wires.

By creating junction clamp 30 as an integral, unitary member it can be quickly applied and secured in place. It takes roughly one half the time it would otherwise take to manually tape this wiring harness junction. The quality of the covering around the enclosed junction which results from junction clamp 30 is uniform and repeatable regardless of changes in assembly personnel. The flexibility of the main panel 31 allows the branch 22, even after being enclosed by clamp 30, to bend and flex relative to the trunk. This flexibility is not possible with a rigid, T-shaped clam-shell design where the halves snap together or which are assembled to each other. The molded plastic construction of junction clamp 30 provides an overall cost efficiency to the invention.

Figure 5:
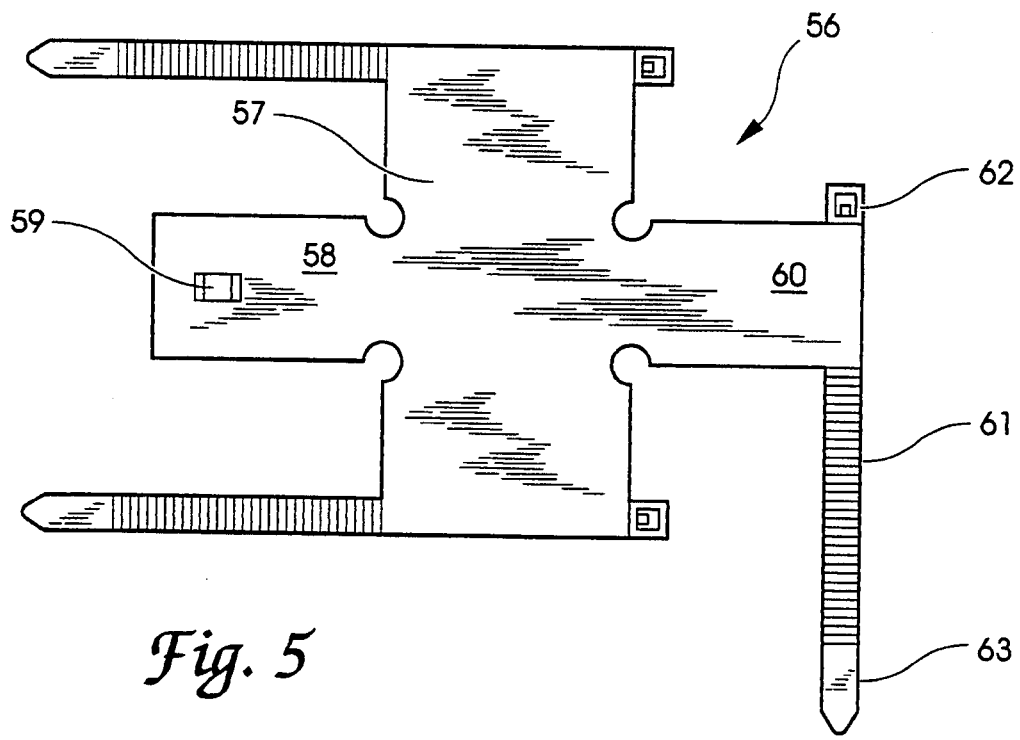
FIG. 5 is a top plan view of a wiring harness junction clamp according to another embodiment of the present invention.

In FIG. 5 junction clamp 56, while having a flexible main panel 57 which is similar in size and shape to the main panel of junction clamp 30 of FIG. 2, has three primary differences. First, in junction clamp 56, side section 58 includes a belt loop 59 which is flush on the interior surface of section 58 and raised on the back side or exterior surface of section 58. The idea of "interior" surface as used herein is established based upon the final form of junction clamp 30 as coiled around the wiring harness. The second primary difference is the elimination of tie heads 36 and 37 from the FIG. 2 junction clamp. A consequence of eliminating the tie heads for tie bands 34 and 35 is the redesign of the tie band for side section 60. Cable tie band 61 includes a tie head 62 and a saw-tooth band 63 which is designed and orientated so as to securely lock into tie head 62. The third primary difference is the elimination of the second tie band as well as the overall manner of coiling and securing side sections 58 and 60 so as to secure the wires of branch 22. When panel 57 is coiled to wrap around (partially) the wiring harness trunk 21, side section 58 is positioned on one side of the branch 22 with side section 60 on the opposite side of the branch. In order to complete the assembly of the sleeve for the branch, band 63 is threaded through belt loop 59 and into head 62 and drawn tight around the branch wires. Junction clamp 56 remains as a one-piece, molded plastic component such that tie bands 64 and 65 as well as tie band 61 are integrally molded in place to their corresponding sections of the flexible main panel 57.

Figure 6:
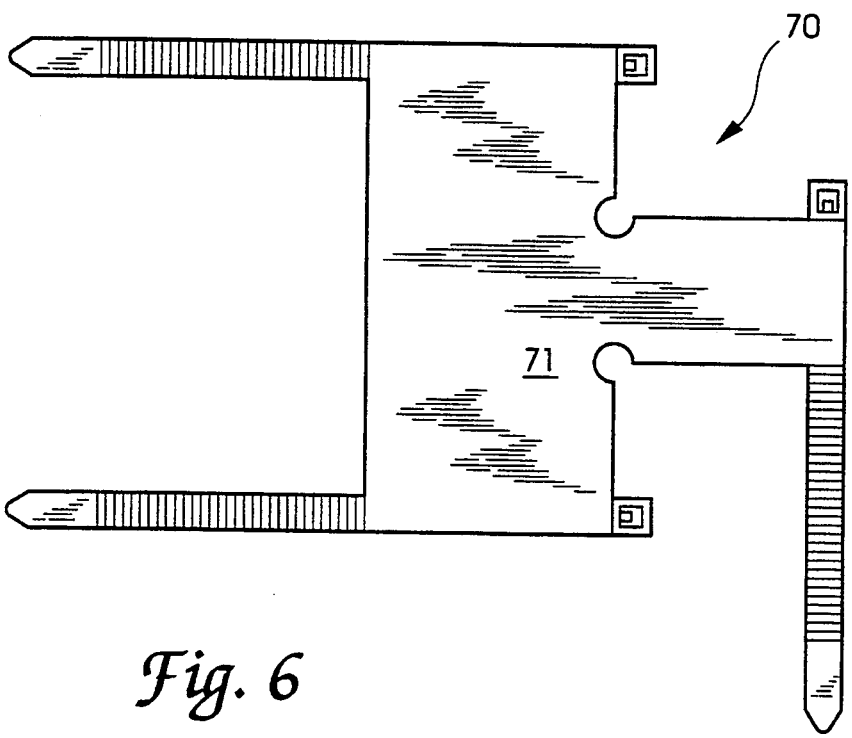
FIG. 6 is a top plan view of a wiring harness junction clamp according to yet another embodiment of the present invention.

Referring to FIG. 6 a still further variation of the present invention is illustrated. Junction clamp 70 is identical in all respects to junction clamp 56 with the exception that side section 58 and belt loop 59 are eliminated. Instead of the flexible main panel 71 having a cross-shape it now has a generally block T-shape. The tie bands and tie heads are unchanged from the FIG. 5 structure and the clamp is still a one-piece, molded plastic component.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A junction clamp for securing the wiring junction between a trunk portion and a split-out branch portion of a wiring harness comprises:

a flexible main panel having a substantially flat trunk section and a substantially flat integral branch section;

a trunk securement joined to said trunk section and including a flexible band portion and a cooperating head portion which is spaced apart from said flexible band portion by said trunk section, said trunk securement in cooperation with said trunk section being designed and arranged to encircle said trunk portion, wherein said flexible band portion is selectively insertable through said head portion to a desired length and said head portion being adapted to interlockingly receive said flexible band portion; and a branch securement joined to said branch section and including a flexible band portion and a cooperating head portion which is spaced apart from said flexible band portion by said branch section, said branch securement in cooperation with said branch section being designed and arranged to encircle said branch portion, wherein said flexible band portion is selectively insertable through said head portion to a desired length and said head portion being adapted to interlockingly receive said flexible band portions.

2. The junction clamp of claim 1 wherein said flexible main panel has a cross-shape with said trunk section and said branch section being arranged generally perpendicular to each other.

3. The junction clamp of claim 1 wherein said flexible main panel has a generally block T-shape with said trunk section and said branch section being arranged generally perpendicular to each other.

4. A junction clamp for securing the wiring junction between a trunk portion and a split-out branch portion of a wiring harness comprises:

a flexible main panel having substantially flat trunk section and a substantially flat integral branch;

a trunk securement including a flexible band portion and a cooperating head portion, said trunk securement in cooperation with said trunk section being designed and arranged to encircle said trunk portion, wherein said flexible band portion is selectively insertable through said head portion to a desired length and said head portion being adapted to interlockingly receive said flexible band portion; and a branch securement including a flexible band portion and a cooperating head portion, said branch securement in cooperation with said branch section being designed and arranged to encircle said branch portion, wherein said flexible band portion is selectively insertable through said head portion to a desired length and said head portion being adapted to interlockingly receive said flexible band portion.

5. The junction clamp of claim 4 wherein said flexible main panel has a cross-shape with said trunk section and said branch section being arranged generally perpendicular to each other.

6. The junction clamp of claim 4 wherein said flexible main panel has a generally block T-shape with said trunk section and said branch section being arranged generally perpendicular to each other.

* * * * *

UNITED STATES PATENT AND TRADEMARK OFFICE
CERTIFICATE OF CORRECTION

PATENT NO. : 5,352,855

DATED : October 4, 1994

INVENTOR(S) : Lex B. Potter

It is certified that error appears in the above-identified patent and that said Letters Patent is hereby corrected as shown below:

On title page, item [73], change "Cumming" to --Cummins--.

Signed and Sealed this

Twentieth Day of December, 1994

Attest:

BRUCE LEHMAN

Attesting Officer

Commissioner of Patents and Trademarks